United States Patent
Bojiuc

(10) Patent No.: US 7,732,973 B2
(45) Date of Patent: Jun. 8, 2010

(54) ELECTROMAGNETIC MACHINE WITH MAGNETIC GAP CHANNELS

(75) Inventor: Dumitru Bojiuc, Marina del Rey, CA (US)

(73) Assignee: Clearwater Holdings, Ltd, Marina Del Rey, CA (US)

( * ) Notice: Subject to any disclaimer, the term of this patent is extended or adjusted under 35 U.S.C. 154(b) by 195 days.

(21) Appl. No.: 12/215,132

(22) Filed: Jun. 25, 2008

(65) Prior Publication Data

US 2009/0322173 A1     Dec. 31, 2009

(51) Int. Cl.
*H02K 1/22* (2006.01)
(52) U.S. Cl. .................................. 310/268; 310/156.01
(58) Field of Classification Search ................. 310/268, 310/266, 156.01
See application file for complete search history.

(56) References Cited

U.S. PATENT DOCUMENTS

| | | | |
|---|---|---|---|
| 4,286,198 A | 8/1981 | Valroger | |
| 4,542,323 A | 9/1985 | Doemen | |
| 4,568,862 A | 2/1986 | Tassinario | |
| 4,626,751 A | 12/1986 | Doemen | |
| 4,806,832 A | 2/1989 | Muller | |
| 4,924,156 A | 5/1990 | Muller | |
| 5,038,083 A | 8/1991 | Muller | |
| 5,134,682 A | 7/1992 | Muller | |
| 6,710,581 B1 | 3/2004 | Lee | |
| 6,803,691 B2 * | 10/2004 | Rose | 310/156.32 |
| 2005/0179336 A1 * | 8/2005 | Hasebe et al. | 310/268 |
| 2006/0043821 A1 * | 3/2006 | Kojima et al. | 310/268 |

* cited by examiner

*Primary Examiner*—Nguyen N Hanh
(74) *Attorney, Agent, or Firm*—Gene Scott; Patent Law & Venture Group

(57) ABSTRACT

An electromagnetic machine has a moving component, a stationary component, and a support component coupling the moving and stationary components in physical and electromagnetic proximity. The stationary component is a wound coil of insulated, electrically conductive tape defining a side face which has a plurality of spaced apart channels in it. The coil carries an electric current so that its opposite faces are north and south electromagnet pole faces and these pole faces are interrupted with spaced apart channels. The moving component is made up of a plurality of permanent magnets arranged in north-to-south pole alignment sequence and spaced apart. Non-magnetic pole surfaces of the magnets are positioned in close mutual proximity to the coil pole face. Electromotive forces are produced by electromagnetic interaction between the coil channels and the permanent magnet pole faces.

11 Claims, 12 Drawing Sheets

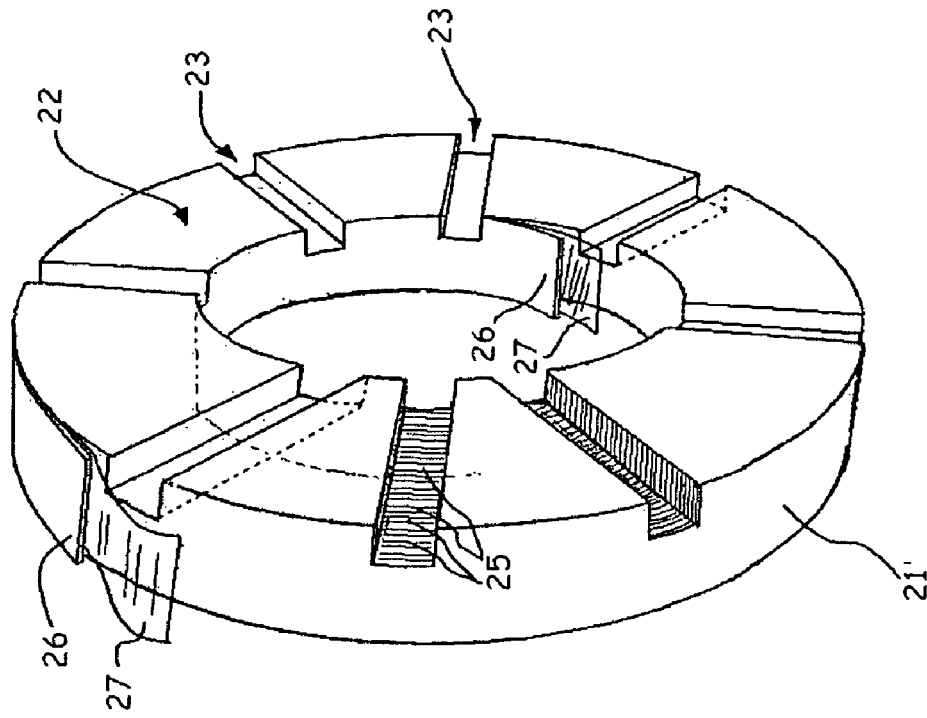
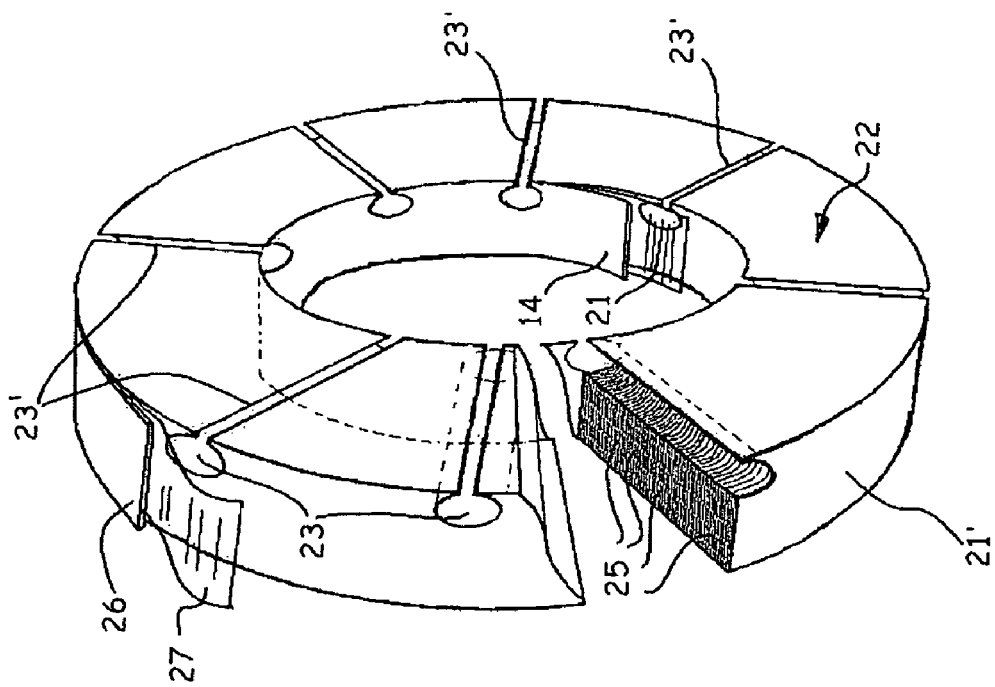

ELECTROMAGNETIC MACHINE WITH MAGNETIC GAP CHANNELS

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

REFERENCE TO A "MICROFICHE APPENDIX"

Not Applicable.

SEQUENCE LISTING

Not Applicable.

BACKGROUND OF THE INVENTION

1. Field of the Present Disclosure

This disclosure relates generally to electromagnetic machines and more particularly to the construction of a direct current electromagnetic apparatus with motor, generator, transformer and transporter applicability.

2. Description of Related Art Including Information Disclosed Under 37 CFR 1.97 and 1.98

Valroger, U.S. Pat. No. 4,286,198, discloses an electronic power supply device for driving a D.C. commutatorless motor that utilizes a plurality of driving coils for supplying power to the motor and at least one control coil, magnetically interconnected with the driving coils, to generate a control signal in response to operation of the motor such that a power transistor, having an output connected to the driving coils, and an input controlled by the at least one control coil to provide the driving current to the driving coils. A Zener diode having a nominal breakdown voltage lower than the breakdown voltage of the power transistor is interconnected therewith.

Doemen, U.S. Pat. No. 4,542,323, discloses a commutatorless DC motor with an armature, a detector for sensing the position of the armature, a motor winding arrangement for supplying current via a bridge network, the network being controlled by semiconductor switches that act in dependence upon the armature position.

Tassinario, U.S. Pat. No. 4,568,862, discloses a DC motor having a disc-shaped rotor carrying permanent magnets having their magnetic axes parallel to the motor shaft and on both sides of the rotor fixed armatures, each armature comprising a rosette-shaped, flat lap armature winding in which the coils partially overlap each other, a slotless iron ring having a flat face to which the coils are fixed, and a connection ring divided into insulated segments receiving the ends of the coils adapted to be energized separately by means of an electronic commutation circuit controlled by a rotary encoder, the groups of segments to which the ends of the coils which are to be energized in parallel are connected, being interconnected by conducting wires extending along the ring. All the component elements of the armature are embedded in plastic material and constitute a compact assembly. If desired, the winding may be of the wave winding type.

Doemen, U.S. Pat. No. 4,626,751, discloses a DC motor without a commutator whereby, when the motor's permanent-magnet rotor is in a first range of angular positions a stator-winding phase is energized to have a first magnetic polarity, and to have an opposite second polarity when the rotor is in a second range of angular positions. The rotor angular position is sensed by a magnetic-field-sensitive semiconductor element, especially a Hall generator, responsive to the field from the permanent-magnet rotor. When the rotor is in a range of angular positions between such first and second ranges, all power transistors are rendered non-conductive, by control signals derived from the magnetic-field-sensitive semiconductor element by intermediate circuitry, to render the stator-winding phase currentless during the time interval within which commutation is to occur. The intermediate circuitry introduces threshold value(s), to determine from the rotor-position signal when the rotor is in such intermediate range, and may furthermore amplify the rotor-position signals and/or apply temperature compensation to highly-temperature-dependent rotor-position signals. The motor is a one-phase collectorless DC motor. The intermediate circuitry can also be used to furnish such temperature compensation in the case of plural-phase collectorless DC motors.

Muller, U.S. Pat. No. 4,806,832, discloses a fan with temperature controlled rotation speed employing a stabilization circuit including a longitudinal branch with a series connection of a Zener diode and a resistor and in the other longitudinal branch with the series connection of a transistor and where the motor winding of the driving electric motor and the cross-branch is provided with a transistor and a corresponding series resistor. In the case of such an operating circuit without current control, the connection of the two modes of operation is advantageously achieved by operating a voltage divider, which comprises a series connection of a temperature dependent resistor element with a relatively small series resistor and a larger adjustable resistor, and in addition in each case again with a smaller series resistor, where this voltage divider influences directly the transistor which is connected in series with the winding. The combination of this temperature dependent circuit for controlling the rotation speed of the stabilization circuit in this simple manner results in a fully satisfying operational circuit.

Muller, U.S. Pat. Nos. 4,924,156, 5,038,083 and 5,134,682, discloses a method for the low-loss regulation of a DC motor without commutator and of a semiconductor circuit in which, during a commutation phase at reduced motor power or rpm as given by a position indicator, the end transistors or one end transistor initially operates temporarily as a switch and thereafter temporarily as an analog amplifier element. During the analog period, a current is available which changes slowly according to a ramp function.

Lee, U.S. Pat. No. 6,710,581, discloses a constant-power brushless DC motor including a stator which is wound in parallel by phases and polarities and configured of n multi-phases, a rotor having a predetermined number of polarities, which is required to concentrate magnetic flux on its area, a commutation encoder including sensing regions and non-sensing regions, and two photo sensors set to each phase, the two photo sensors being connected to a controller, to excite only (n-b) phases among n phases, starting and rotating the motor, thereby realizing a constant-power DC motor without commutator, which is effective in energy saving, has good characteristic of continuous speed conversion and compact configuration.

The related art described above discloses brushless DC motors of several types including those that operate with permanent magnet rotors, commutation encoders, commutation phasing, electronic commutation controlled by a rotary encoder, and other types. However, the prior art fails to disclose a DC motor-generator that utilizes a flat tape wound coil stator that produces opposing electromagnetic poles on its side surfaces, where the coil is in gap-spaced proximity to a circular arrangement of magnets positioned in opposing pole alignment. The present disclosure distinguishes over the prior art providing heretofore unknown advantages as described in the following summary.

BRIEF SUMMARY OF THE INVENTION

The present invention is an electromagnetic rotating or translating machine. As a rotating machine it may be configured and used as a DC motor, a DC generator, a torque converter, a DC transformer, a step-up or step-down rotational velocity converter and other applications. As a translating machine it may be configured as a linear driver, a transporter and various linear actuation devices. A stationary part of the machine is made of a continuous winding of thin flat conductive tape with an insulation layer between windings to prevent shorts. The moving part of the machine is made up of a plurality of permanent magnets set in either a toroidal arrangement for a rotating machine, or in a linear arrangement as a translating machine. Both the rotating version and the translating version of the present invention use the same components with configurational distinctions and operate in accordance with the same physical principals.

The principal of operation of the present invention is to generate an electromotive force between a moving rotor and a stationary stator. For example, the stator presents an electromagnet pole face to the rotor and this pole face is a north N magnetic pole over its entire surface. This pole face is broken by spaced apart linear channels.

The rotor presents a series of permanent magnets mounted so that their side surfaces lie in a common plane set parallel to the stator's pole face. The magnets are arranged with their S and N pole faces oriented orthogonal to the stator's pole face and with the S pole face leading its N pole face in the direction of rotor motion. The magnets are spaced apart by a linear gap which does not align with the channels of the stator.

When the electromagnet is energized the stator's N pole face appears. The S pole faces of the magnets are attracted to the stator's N pole faces within the channels, while the N pole faces of the magnets are repelled by the stator's N pole faces within the channels. This attraction and repulsion results in an electromotive torque applied to the rotor assuming that it is mounted on and moves in rotation on an axle, or linearly on a rail for instance.

This disclosure teaches certain benefits in construction and use which give rise to the objectives described below.

A primary objective inherent in the above described apparatus is to provide advantages not taught by the prior art.

Another objective is to provide an electromagnetic rotating machine having a toroidal coil formed with windings of flat conductive tape.

Another objective is to provide such a machine having a toroidal arrangement of permanent magnets positioned in opposing pole sequence.

Another objective is to provide such a machine wherein the permanent magnets are sandwiched between opposing sets of the toroidal coils.

Another objective is to provide such a machine wherein each of the coils provides linear slots in a face adjacent to the permanent magnets.

Another objective is to provide such a machine wherein the coil is sandwiched between opposing sets of the opposing permanent magnets.

Another objective is to provide an electromagnetic translating machine having an elongated coil formed with windings of flat conductive tape.

Another objective is to provide such a machine having a linear arrangement of permanent magnets positioned in opposing pole sequence.

Another objective is to provide such a machine wherein the permanent magnets are sandwiched between opposing sets of the toroidal coils.

Another objective is to provide such a machine wherein each of the coils provides linear non-vertical slots in a face adjacent to the permanent magnets.

Another objective is to provide such a machine capable of operating as a torque converter.

Another objective is to provide such a machine capable of operating as a DC transformer.

Another objective is to provide such a machine capable of operating as a rotational velocity converter.

Another objective is to provide such a machine capable of operating as a motor-generator.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE DRAWINGS

The present invention will be described in more detail with reference to the accompanying drawing from which further features and advantages of the invention become evident wherein:

FIGS. 2a and 2b are perspective views of two embodiments of a toroidal coil thereof with radial slots on one face;

DETAILED DESCRIPTION OF PREFERRED EMBODIMENTS

The above described drawing figures illustrate the present apparatus and its method of use in at least one of its preferred, best mode embodiments, which is further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present apparatus and its method of use.

Described now in detail is an electromagnetic machine comprising a moving component, which will be referred to by the term "rotor 10," and shall mean either a rotating element or a linearly translating element. A stationary component, stator 20, and a support component, which shall be referred to by the term, "frame 30" complement the rotor 10 as the primary components of the presently described machine. The frame 30 is functional for supporting the rotor 10 and stator 20 in physical and electromagnetic proximity for efficient operation as will be described below. In one aspect of the present machine the rotor 10 describes rotational motion and several embodiments are described. In another aspect of the present machine, the "rotor" 10 describes translational motion, and several further embodiments are described which correspond with the rotational motion embodiments. In all of the embodiments, the same theory of operation is embodied and similar constructional details are employed.

The present electromagnetic machine comprises at least one rotor 10, at least one stator 20, and a frame 30. Versions of this machine are shown in FIGS. 1, 4, 7, 8, 9 and 10 and will be separately described below. Generally, the frame 30 joins the rotor(s) 10 and the stator(s) 20 in physical and electromagnetic proximity allowing for electromagnetic coupling. The machine may be configured as a DC motor or generator or as a translator, as will be shown. In rotating versions of the machine a shaft 40 is used for supporting either the rotor 10 or the stator 20 as will be described.

Figure 3:
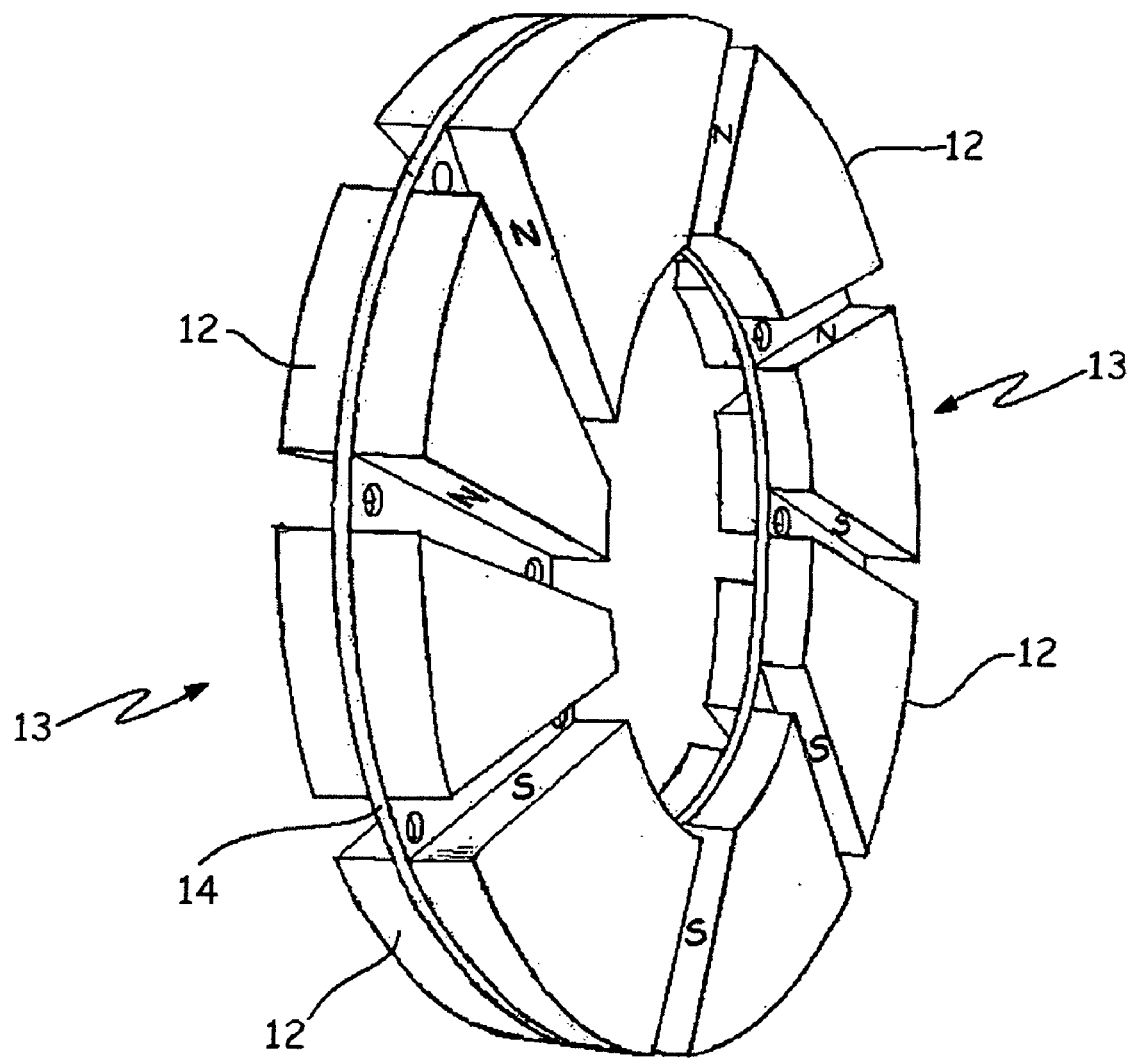
FIG. 3 is a perspective view of a two sided toroidal permanent magnet set thereof with non-radial spaces between the magnets.
Figure 4:
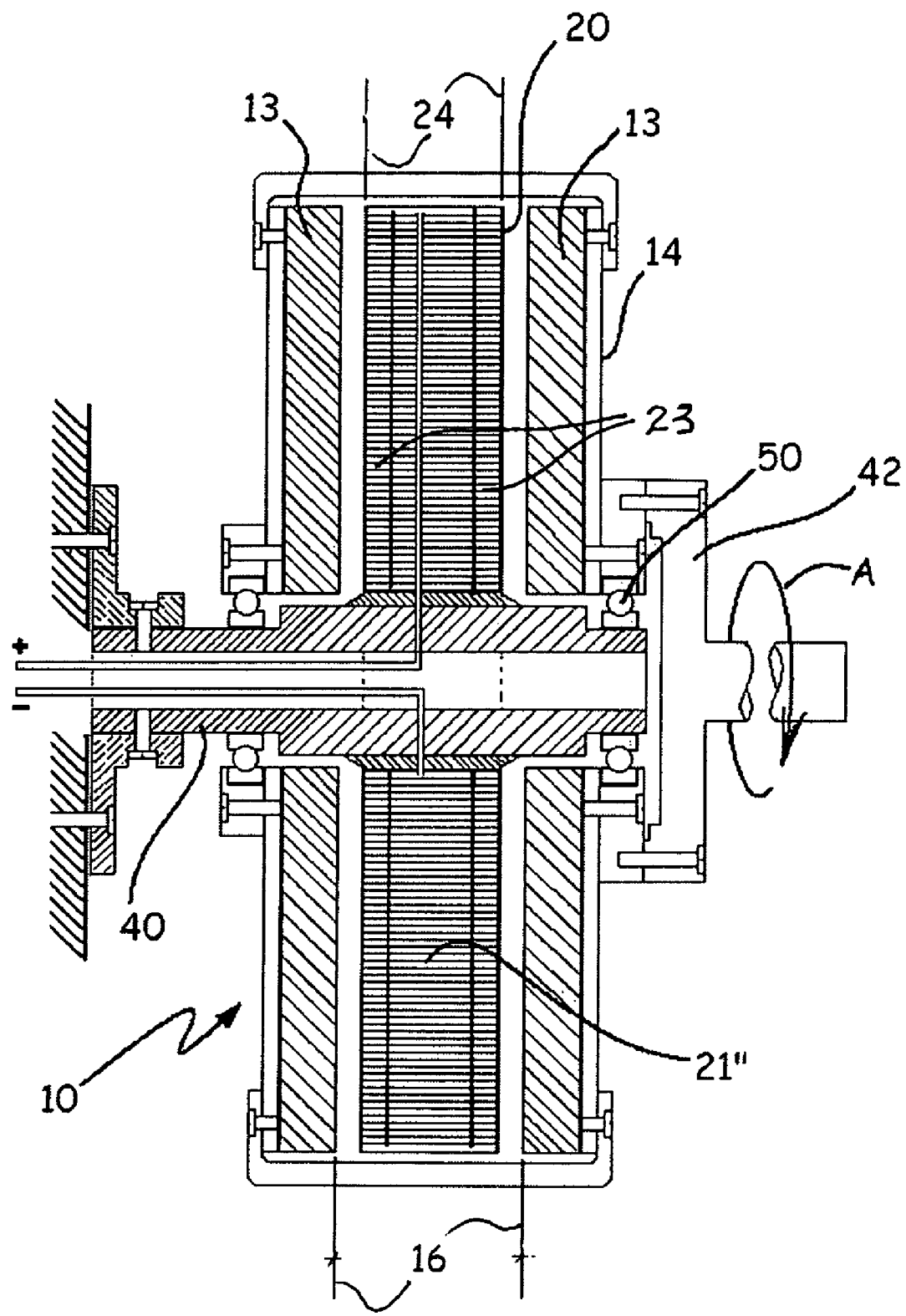
FIG. 4 is a vertical cross section of a f further rotating embodiment of the present invention with a toroidal coil sandwiched between a pair of toroidal sets of permanent magnets.
Figure 5:
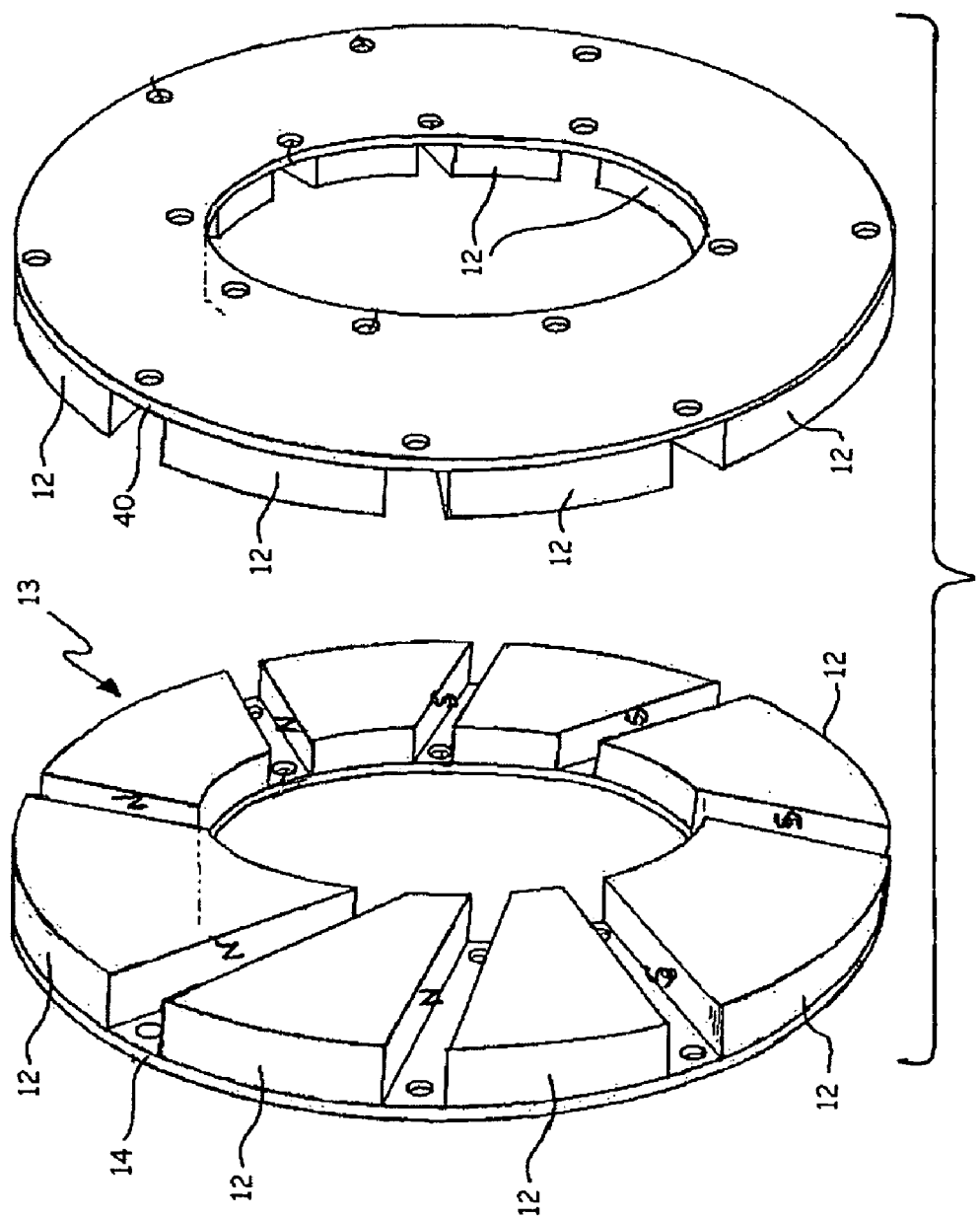
FIG. 5 is a perspective view of the pair of toroidal sets of permanent magnets thereof showing non-radial spaces between each pair of the magnets.

In all embodiments of the present invention, the rotor 10 or two rotors 10 each comprise(s) a plurality of permanent magnets 12 constituting a magnet set 13, arranged in pairs having opposing pole gapped alignment, by which is meant that the permanent magnets 12 are arranged in a positional sequence with a gap or space between each adjacent pair of the magnets 12 and with opposing pole surfaces of the adjacent permanent magnets 12 facing each other. This arrangement is best shown in FIGS. 3 and 5. In all figures, the letter "N" is placed in the drawing figures to indicate a north pole face of a permanent magnet 12 and the letter "S" is placed to indicate a south pole face of a permanent magnet 12. The permanent magnets 12 are preferably mounted on a plate 14 of ferromagnetic material such as an iron or nickel bearing alloy so that the surfaces of all of the permanent magnets 12 that face away from the plate 14 define a magnet plane 16 (FIG. 4). In rotating embodiments of this invention, the plate 14 is preferably a disk as shown in FIGS. 3 and 5, and in translating embodiments, the plate 14 is preferably an elongated and planar structural member, as shown in FIGS. 8, 9 and 10.

Figure 6B:
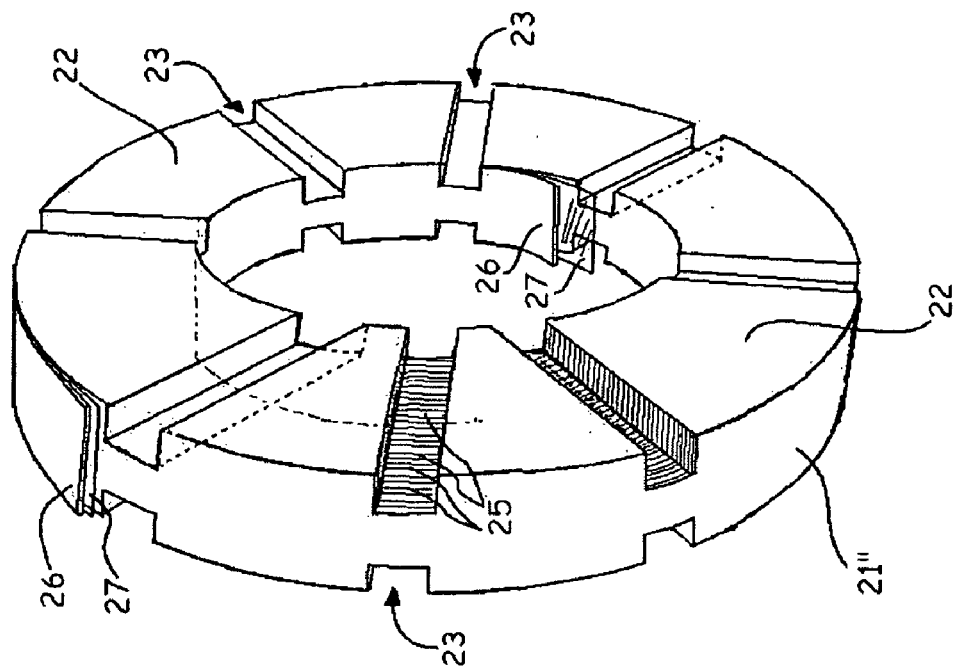
FIGS. 6A and 6B are perspective views of a toroidal coil thereof with radial slots on opposing faces.
Figure 6A:
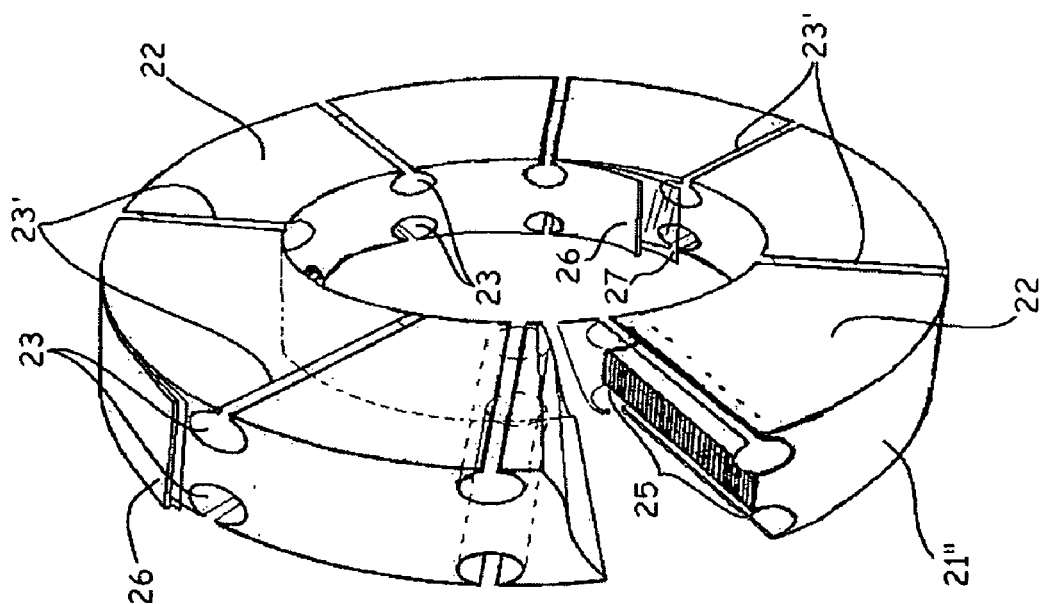
Figure 8:
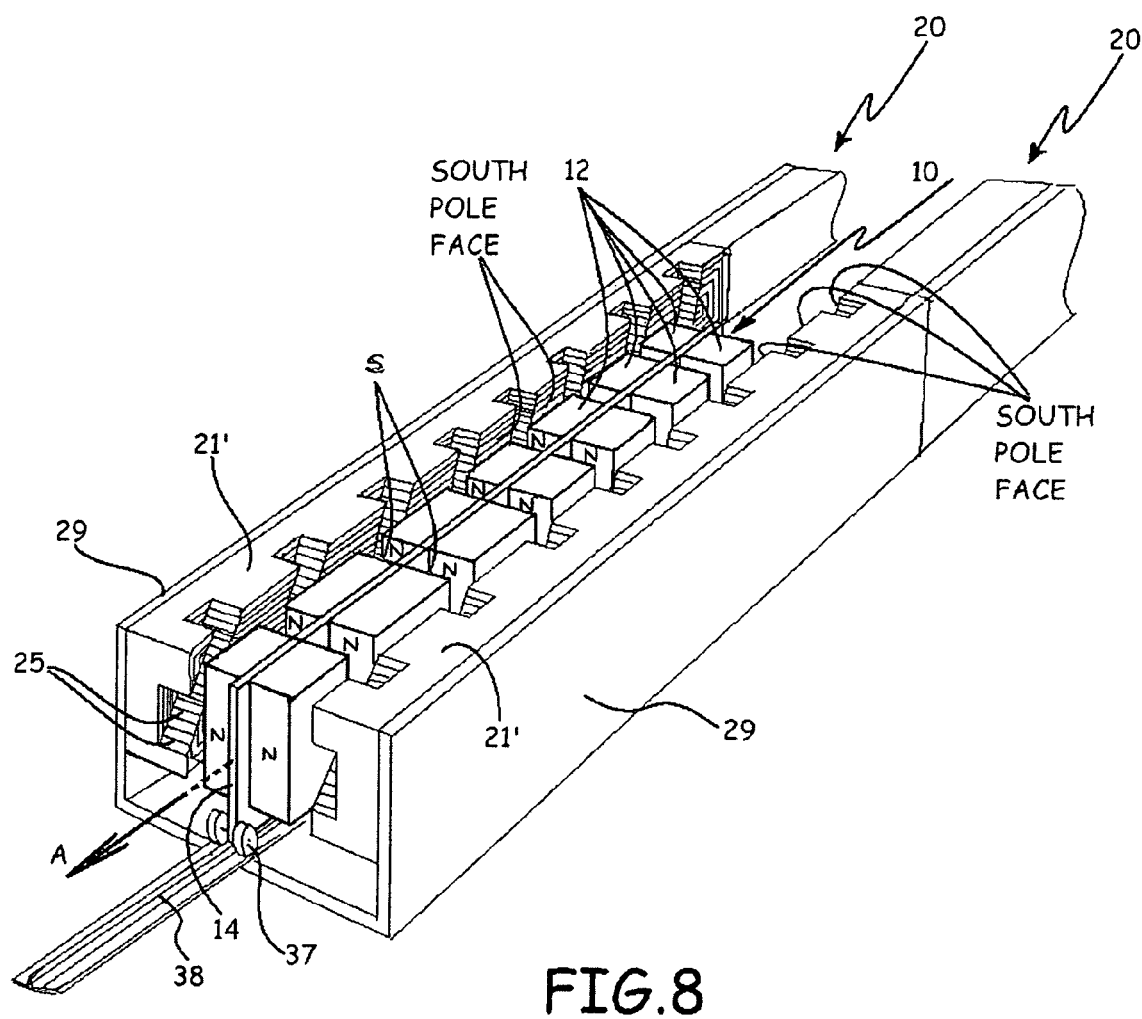
FIG. 8 is a perspective view of a translating embodiment of the present invention showing linear sets of permanent magnets moving on rails and sandwiched between fixed opposing linear arrangements of elongated coils.
Figure 9:
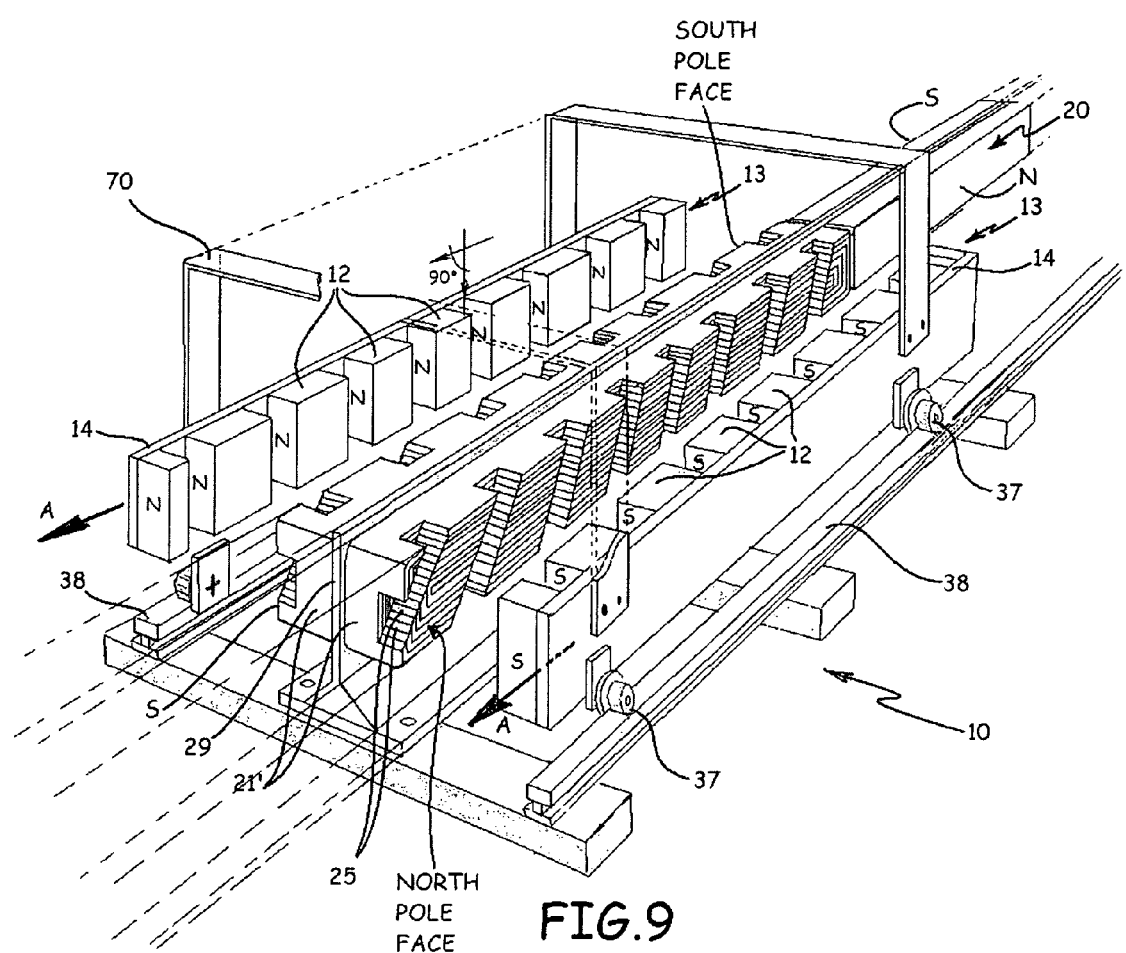
FIG. 9 is a perspective view of a further translating embodiment of the present invention with a fixed linear elongated coil sandwiched between a pair of joined linear sets of moving permanent magnets moving on rails in a common direction.
Figure 10:
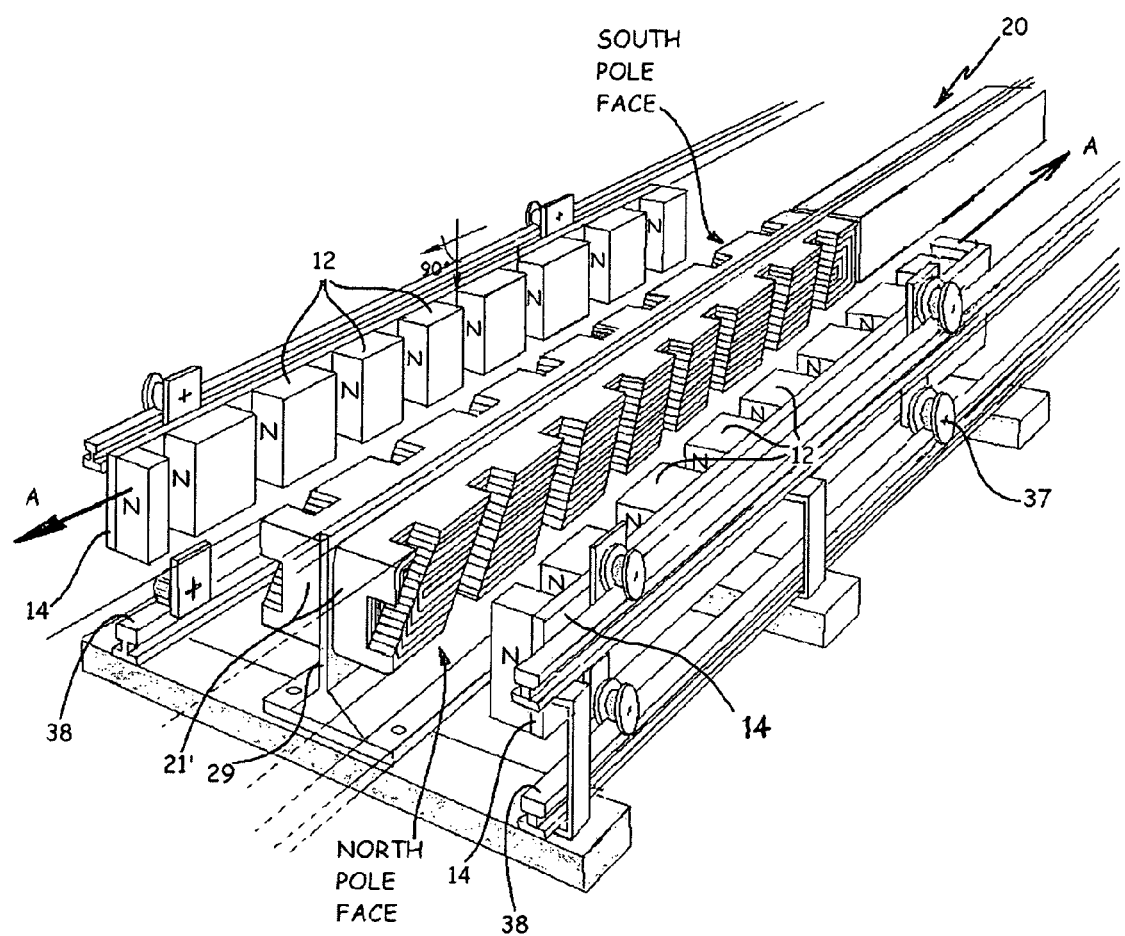
FIG. 10 is a perspective view of a further translating embodiment of the present invention with a fixed linear coil sandwiched between a pair of linear sets of counter moving permanent magnets moving on rails.

In all embodiments of the present invention, the stator 20 comprises a coil 21" (channels on both faces) or two coils 21' (channels on only one face of each coil) and each said coil is constructed of insulated, electrically conductive, tape layers 25 wound as a circular toroid (FIGS. 2A, 2B, 6A and 6B) or as a flattened and elongated sudo-toroid (FIGS. 8, 9 and 10). It is noted that the numeral "21" without parentheses will be used herein when referring to coils in general without inference to those having one or both side channels. Each of the coils 21' or 21" have a pair of opposing side faces 22 establishing a face plane 24, i.e., the planes that the side faces 22 lie within (FIG. 4). One or both of the side faces 22 have a plurality of spaced apart channels 23 in them. FIGS. 2A, 2B and 8 are examples of coils 21' with the channels 23 in only one side face 22, while FIGS. 6A, 6B, 9, and 10 are examples of coils 21" with the channels 23 in both side faces 22. It is noted that the channels 23 may be of two different types. In FIGS. 2A and 6A, the channels 23 are essentially round bores which breakout eccentrically to the side face 22 defining an elongated window 23' that is narrower than the full diameter of the round bore. In FIGS. 2B and 6B, the channels 23 are square or rectangular in shape and open at one side to the side face 22. The distinctions in operating characteristics between these two channel shapes are not of issue herein and it is noted that either of these two channel shapes or other channel shapes can be used in any of the embodiments of the present invention interchangeably with more or less effectiveness, and those drawing figures that show one or the other of the channel shapes shall be understood to also take the meaning of the alternate one of the channel shapes. In the rotating embodiments of this invention, the coils 21 are mounted on a round shaft 40 and in the translating embodiments they are mounted on elongated coil plates 29. In all cases, the coil plates 29 are insulated electrically from the electrical currents carried by the coils 21 and the plates can be of either a magnetic or of a non-magnetic material but electrically insulated from the coil so as to prevent electrical short circuiting.

Figure 1:
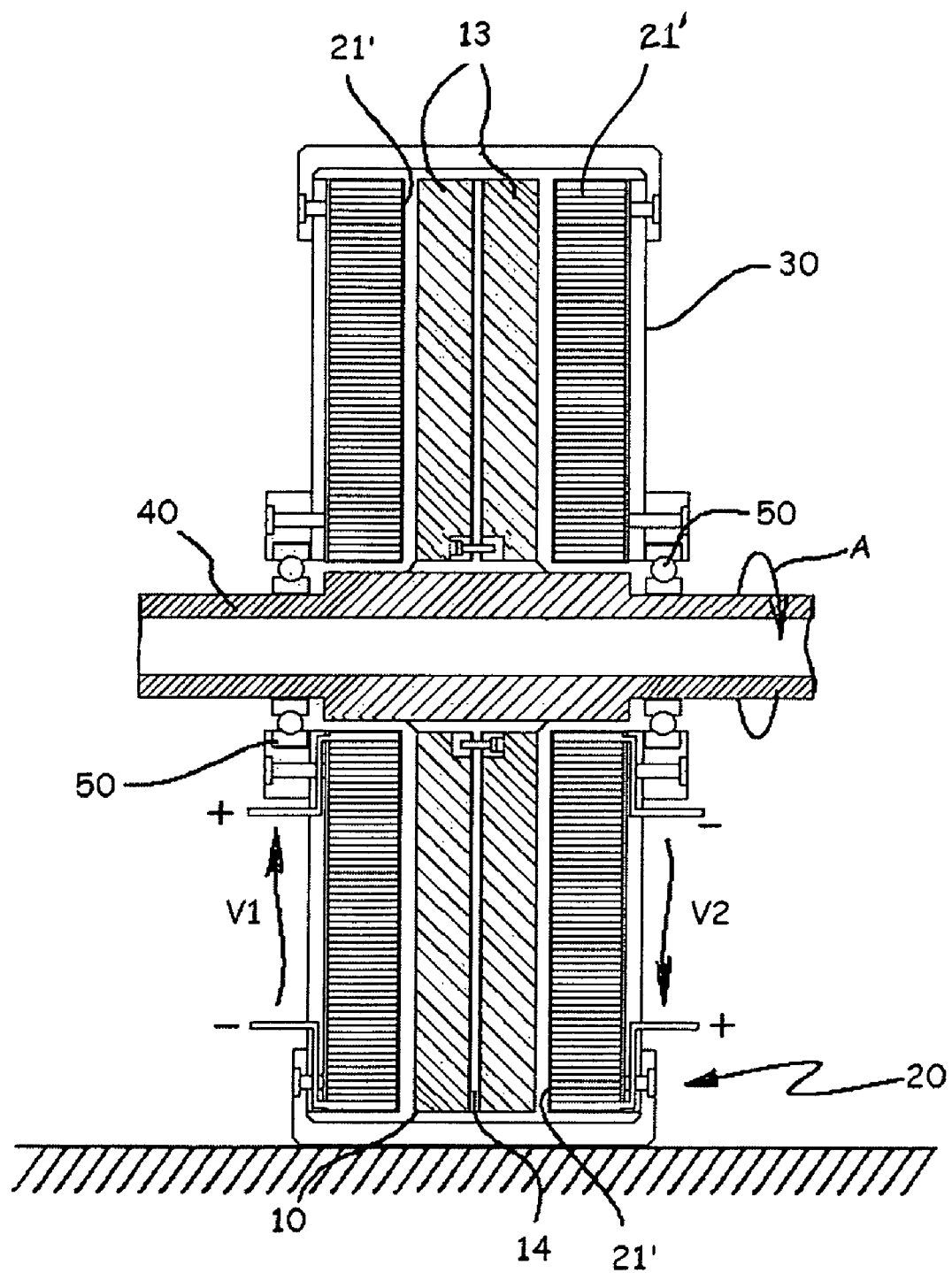
FIG. 1 is a vertical cross section of a rotating embodiment of the present invention with toroidal sets of permanent magnets sandwiched between toroidal coils.

In the rotating embodiment of FIG. 1 the stator 20 comprises two spaced apart coils 21' secured by frame 30. Between coils 21', permanent magnet sets 13 are mounted back-to-back on plate 14 which is secured to shaft 40 forming the rotor 10. The magnet sets 13 are sandwiched between the coils 21' as can be seen in the figure. Bearings 50 enable the rotor 10 to rotate independently of the stator 20. The two coils in this embodiment enable the machine to operate as a DC transformer wherein the input current and voltage (V1) at one of the coils 21' may be converted to a different current and voltage (V2) at the other of the coils 21', stepping-up or down, depending on the ratio of the number of permanent magnets 12 in the two magnet sets 13 and/or the ratio of the number of turns in the two coils 21'.

In the rotating embodiment of FIG. 4 the stator 20 is a single coil 21" mounted on shaft 40, and two spaced apart permanent magnet sets 13 are secured by plate 14 forming the rotor 10. The coil 21" is sandwiched between the magnet sets 13 as can be seen in the figure. In this configuration, shaft 40 is non-rotating, and rotor 10, comprising both permanent magnet sets 13 is coupled to an external driving/driven member 42. In order to assure that the stator 20 does not rotate, one end of shaft 40 is secured to a stationary fixture as shown conceptually. This embodiment of the present inventive machine functions as either a motor or a generator.

Figure 7:
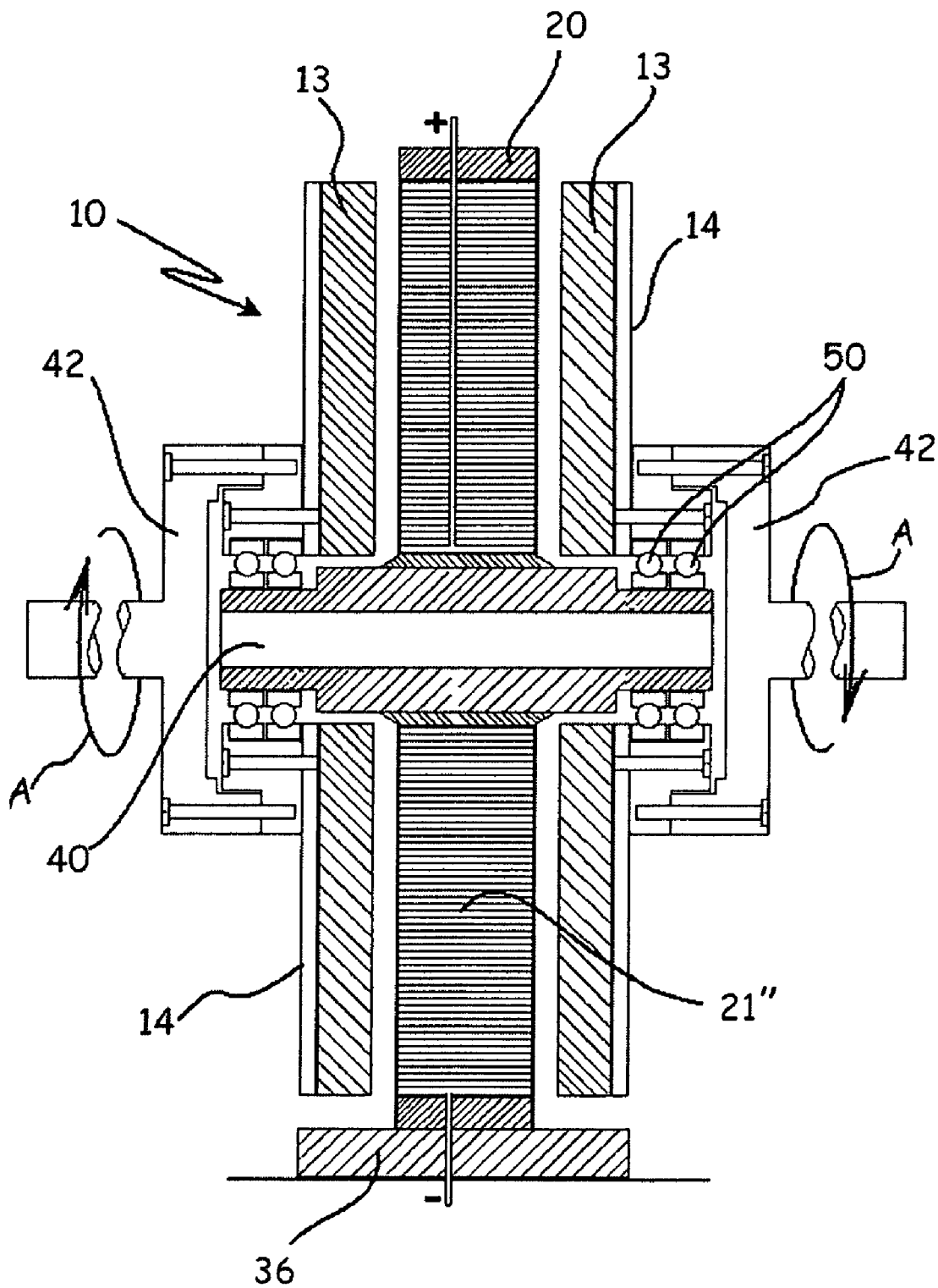
FIG. 7 is a vertical cross section of a still further rotating embodiment of the present invention with a toroidal coil sandwiched between a pair of counter rotating toroidal sets of permanent magnets.

The rotating embodiment of FIG. 7 is similar to that of FIG. 4 except that the permanent magnet sets 13 are configured as two separate rotors 10. The stator 20 is mounted on a stationary fixture 36 and is fixed to shaft 40. In this case each of the rotors 10 is able to rotate independently of the other for mutually coordinated rotation, counter-rotation, synchronized rotation or differential rotation. In this split personality version of the present invention, one half of the machine may operate as a generator while simultaneously the other half operates as a motor. For instance, driving/driven member 42 on the left may be a driven member so that electromotive forces created between magnet set 13 on the left and the coil 21' operates as a generator, while current flow in coil 21' produces electromotive forces between the coil 21' and the magnet set 13 on the right to produce motor rotation at driving/driven member 42. FIG. 7 depicts operation in counter rotating operation but the rotors 10 may just as well rotate in the same direction if the permanent magnet arrangements are correspondingly oriented. Depending on the ratio of the number of permanent magnets 12 mounted in the two magnet sets 13, this machine may operate as a torque converter or a speed reducer.

As shown in the translating embodiments of FIGS. 8, 9 and 10, the rotor 10 is a translating member. Permanent magnet sets 13 are fixtured linearly on linearly extensive flat plates 14 which are mounted on wheels 37 so as to move on rails 38. In the embodiment of FIG. 8, the permanent magnets 12 are mounted back-to-back, as in FIG. 3, while in FIGS. 9 and 10, the magnet sets 13 are mounted separately as in FIGS. 4 and 7 respectively. The relationship between the rotating embodiments and the translating embodiments is clear.

Figure 11:
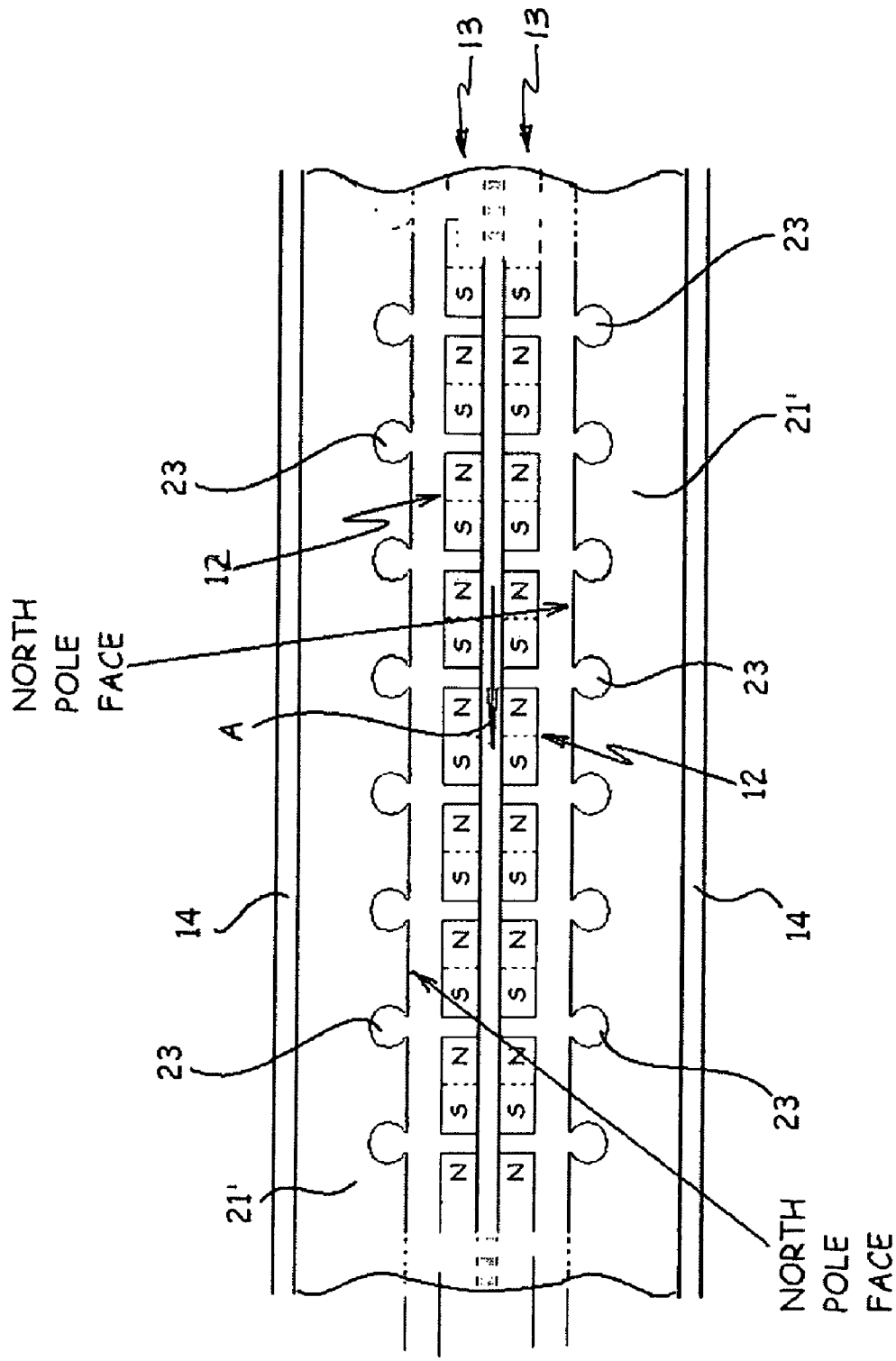
FIG. 11 is a plan view, in schematic form, typifying a portion of the apparatus shown in FIGS. 1 and 8.
Figure 12:
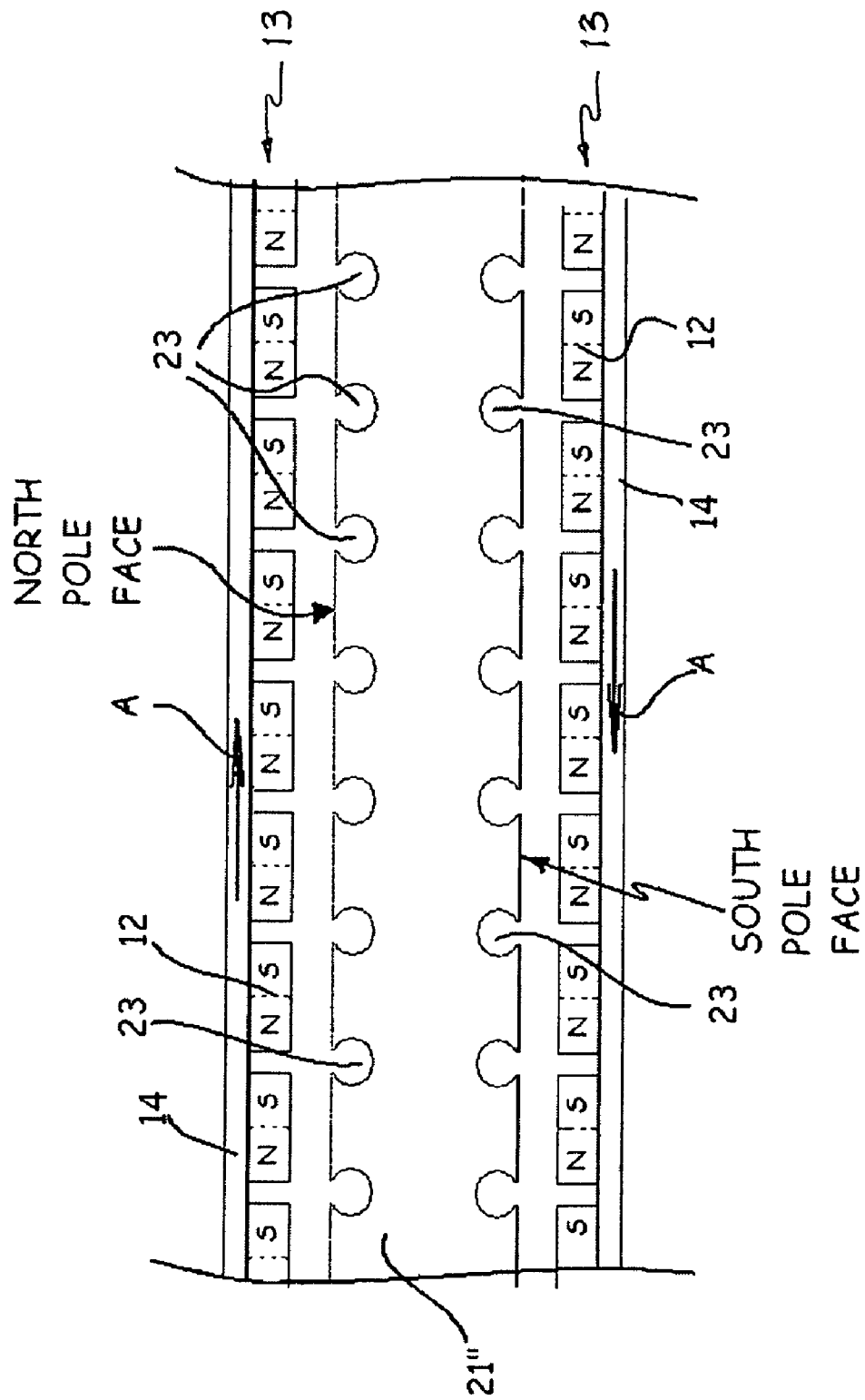
FIG. 12 is a plan view in schematic form typifying a portion of the apparatus shown in FIGS. 4, 7, 9, and 10.

In FIGS. 11 and 12 we see, in schematic form, the two essentially distinct physical arrangements of the present invention. FIG. 11 shows coils 21' positioned on opposing sides of back-to-back mounted magnet sets 13, and FIG. 12 shows the alternate configuration wherein the magnet sets 13 sandwich a centered coil 21'. Electric current flows through the coil's winding serially. As shown by the "N" and "S" markings in these figures it is understood that the coil 21', when carrying electrical current, forms a toroidal or sudotoroidal electromagnet with one of its sides established as a north pole face "N", and the opposing side established as a south pole face "S". The magnet plane is in parallel juxtaposition with the coil face plane and these two planes are positioned as close together as possible to enable efficient electromagnetic coupling between the channels 23 and the permanent magnet pole faces 24. In FIGS. 9 and 10 the spacing between coils 21 and magnets 12 is shown expanded for clarity of detail, but actual spacing is closer than as shown in the figure for proper magnetic coupling.

As shown in FIGS. 2A, 2B, 6A, 6B and 8, 9 and 10 toroidal coils 21 are wound using a flat electrically conductive tape 26 coiled, as shown in the figures, with concentric tape layers 25 that are insulated from each other and terminating at the outer and inner peripheries of the coils 21' and 21". Preferably, the conductive tape is made of steel with a continuous copper or aluminum coating on at least one of its surfaces for improved conductivity. The windings are insulated from each other preferably by winding a continuous Kapton® film sheet 27 between the tape layers 25.

In each embodiment described above, magnet sets 13 move past one or both side faces 22 of the coils 21. FIGS. 11 and 12 are snapshots of this motion at an instant when each channel 23 is exactly opposite one of the spaces between adjacent permanent magnets 12. At this instant, the attractive and repulsive forces between directly opposite magnet poles of the permanent magnets 12 that are in magnet plane 16 (FIG. 4) and coil channels 23 result in a continuous electromotive torque and movement of the rotor(s) 10. It is preferable to position the gaps between permanent magnets 12 so as to not align with the channels. In an alternate approach the channels 23 are not radial in the rotating embodiments and are not vertical in the translating embodiments as shown in the figures. Attractive/repulsive forces exist between the pole faces of each permanent magnet 12 and the interior surfaces of channels 23 which interrupt the continuity of the magnetic field at the side faces 22. The S pole face of each permanent magnet 12 is attracted to an N surface of each channel 23 as it approaches, and the N pole face of each permanent magnet 12 is repulsed by the wall of channel 23 that it is receding from due to the physical orientation of the permanent magnets 12 relative to the N pole face 22. In this motion there is no time when the magnetic field needs to be reversed, or when there is a magnetic attraction or repulsion that is counter to the rotor's relative motion because the channels 23 prevent the well known "end-effects" where an opposite magnetic field is induced causing drag. In all figures of this application, the rotor 10 moves in the direction shown by arrow "A." In FIG. 1 voltages V1 and V2 are defined.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. An electromagnetic machine comprising: at least one tape electromagnet wound coil, a plurality of permanent magnets, and a support frame, the support frame coupling the tape electromagnet wound coil and permanent magnets in close proximity; the tape electromagnet wound coil having insulated, electrically conductive windings of a flat tape, and opposing side faces, wherein, at least one of said side faces has a plurality of spaced apart channels; the permanent magnets arranged in fixed spaced-apart positions in at least one common plane with each one of the permanent magnets presenting an opposing magnetic pole face to each adjacent one of the permanent magnets, a corresponding non-pole surface of each of the permanent magnets defining the at least one common plane, the at least one common plane positioned in mutual parallel close adjacency to the at least one of said opposing side faces, wherein with electric current flowing in the tape electromagnet wound coil, the opposing side faces of the tape electromagnet wound coil are established as opposing electromagnetic pole faces establishing electromotive forces on the permanent magnets causing relative motion between the channels of the tape electromagnet wound coil and the magnetic pole faces of the permanent magnets.

2. The electromagnetic machine of claim 1 wherein the tape electromagnet wound coil comprises two spaced apart said tape electromagnet wound coils with the plurality of permanent magnets sandwiched therebetween.

3. The electromagnetic machine of claim 2 wherein the permanent magnets are secured to at least one rotor of the machine.

4. The electromagnetic machine of claim 2 wherein the permanent magnets are secured to a translator of the machine.

5. The electromagnetic machine of claim 1 wherein the plurality of permanent magnets comprises two sets of spaced apart said permanent magnets with the tape electromagnet wound coil sandwiched therebetween.

6. The electromagnetic machine of claim 5 wherein at least one said set of the permanent magnets is secured to a rotor of the machine.

7. The electromagnetic machine of claim 5 wherein at least one said set of the permanent magnets is secured to a translator of the machine.

8. The electromagnetic machine of claim 1 wherein the permanent magnets are mounted on a flat plate.

9. The electromagnetic machine of claim 8 wherein the permanent magnets are mounted in sets with one of the sets of permanent magnets on each one of two opposing surfaces of the flat plate.

10. An electromagnetic machine capable of generating electromotive forces between a stationary and a moving elements, the electromagnetic machine comprising: a coil-wound stator having a stator north magnetic pole face and, in opposition thereto, a stator south magnetic pole face when electrical current flows in the coil-wound stator; and in close proximity to one of said pole faces of the coil-wound stator, a plurality of permanent magnets of a permanent magnet rotor, wherein each of the permanent magnets has a magnet north pole face in opposition to a magnet south pole face; the magnet north and south pole faces of each of the permanent magnets aligned in orthogonal juxtaposition to the one of said pole faces of the coil-wound stator; the permanent magnets separated by gaps therebetween with opposing magnet pole faces mutually aligned and facing across said gaps; wherein the one of said pole faces of the coil-wound stator has spaced apart channels therein, the channels non-aligned with said gaps between the permanent magnets.

11. An electromagnetic machine capable of generating electromotive forces between a stationary and a moving elements, the electromagnetic machine comprising: a coil-wound stator having a stator north magnetic pole face and, in opposition thereto, a stator south magnetic pole face when electrical current flows in the coil-wound stator; and in close proximity to both of said pole faces of the coil-wound stator, a pair of pluralities of permanent magnets mounted respectively on a pair of permanent magnet rotor, wherein each of the permanent magnets has a magnet north pole face in opposition to a magnet south pole face; the magnet north and south pole faces of each of the permanent magnets of each one of the pair of pluralities of permanent magnets aligned in orthogonal juxtaposition to the one of said pole faces of the coil-wound stator; the permanent magnets within each one of the pair of pluralities of permanent magnets separated by gaps therebetween with opposing magnet pole faces mutually aligned and facing across said gaps; wherein each of said pole faces of the coil-wound stator has spaced apart channels therein, the channels non-aligned with said gaps between the permanent magnets.

* * * * *